(12) United States Patent
Watanabe et al.

(10) Patent No.: US 7,556,008 B2
(45) Date of Patent: Jul. 7, 2009

(54) INTERNAL COMBUSTION ENGINE INTAKE DEVICE

(75) Inventors: Michio Watanabe, Yokohama (JP); Yuuki Sakai, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 126 days.

(21) Appl. No.: 11/762,316

(22) Filed: Jun. 13, 2007

(65) Prior Publication Data
US 2008/0000442 A1   Jan. 3, 2008

(30) Foreign Application Priority Data
Jun. 29, 2006   (JP)   ............................. 2006-179226
Jun. 6, 2007    (JP)   ............................. 2007-150748

(51) Int. Cl.
*F02M 35/10* (2006.01)

(52) U.S. Cl. .................................. 123/184.21; 181/229

(58) Field of Classification Search ............ 123/184.21, 123/184.53, 184.59; 181/229
See application file for complete search history.

(56) References Cited

U.S. PATENT DOCUMENTS

| 4,971,172 | A | 11/1990 | Hoffman et al. | |
| 6,725,822 | B2 * | 4/2004 | Matsumoto et al. | .... 123/184.34 |

FOREIGN PATENT DOCUMENTS

| EP | 0541016 A1 | 5/1993 |
| EP | 0995896 A2 | 4/2000 |
| EP | 1515037 A1 | 3/2005 |
| GB | 2333270 A | 7/1999 |
| JP | S63-198422 U | 12/1988 |
| JP | H01-280631 A | 11/1989 |
| JP | H11-020483 A | 1/1999 |
| JP | 2004-150309 A | 5/2004 |
| JP | 2006-152811 A | 6/2006 |
| JP | 2007192060 A * | 8/2007 |

* cited by examiner

*Primary Examiner*—Noah Kamen
(74) *Attorney, Agent, or Firm*—Global IP Counselors, LLP

(57) ABSTRACT

An internal combustion engine intake duct device is provided with an intake duct body and an air flow directing structure. The intake duct body has an inlet, a left outlet and a right outlet with an intake air passage formed in the intake duct body for supplying intake air from the inlet to left and right outlets. The inlet is disposed on an opposite side of the intake duct body from the left and right outlets and laterally between the left and right outlets in a top plan view. The air flow directing structure is arranged in the intake duct body to direct a flow of intake air entering from the inlet toward the left and right outlets. The air flow directing structure includes a first sound reflecting part serving to block sound from the left intake pipe and a second sound reflecting part serving to block sound from the right intake pipe.

20 Claims, 11 Drawing Sheets

US 7,556,008 B2

INTERNAL COMBUSTION ENGINE INTAKE DEVICE

CROSS-REFERENCE TO RELATED APPLICATIONS

This application claims priority to Japanese Patent Application No. 2006-179226, filed on Jun. 29, 2006, and Japanese Patent Application No. 2007-150748 filed on Jun. 6, 2007. The entire disclosures of Japanese Patent Application No. 2006-179226 and Japanese Patent Application No. 2007-150748 are hereby incorporated herein by reference.

BACKGROUND OF THE INVENTION

1. Field of the Invention

The present invention relates to an intake device for an internal combustion engine. More particularly, the present invention relates to an intake device configured to introduce outside air into an engine with two flow passages, i.e., a left flow passage and a right flow passage.

2. Background Information

Some internal combustion engines are provided with an air induction system having an intake air collector arranged upstream of an intake manifold that is arranged to distribute the intake air to a plurality of cylinders of the engine. Examples of this type of air induction system are disclosed in Japanese Laid-Open Patent Publication No. 1-280631 and Japanese Laid-Open Patent Publication No. 63-198422. The purpose of the collector is to increase the efficiency with which the intake air fills the cylinders and, thereby, increase the engine output.

SUMMARY OF THE INVENTION

It has been discovered that although the above described air induction system is provided with an intake duct device (intake device) for introducing outside air, the air flow resistance needs to be reduced in order to supply the intake air smoothly to the engine. Meanwhile, there is also a need to achieve a prescribed characteristic of the air induction system with respect to sound transmitted from the engine to the air induction system (tone improvement characteristic) in a region of normally used engine speeds.

The present invention was developed in view of these needs. Thus, one object of the present invention is to provide an intake device for an internal combustion engine that can satisfy both the need to reduce the air flow resistance and the need to improve the characteristics of the intake device regarding sound transmitted from the internal combustion engine.

In order to achieve the aforementioned object, the present invention provides an internal combustion engine intake device that basically comprises an intake duct body and an air flow directing structure. The intake duct body has an inlet, a left outlet and a right outlet with an intake air passage formed in the intake duct body for supplying intake air from the inlet to left and right outlets. The inlet is disposed on an opposite side of the intake duct body from the left and right outlets and laterally between the left and right outlets in a top plan view. The air flow directing structure is arranged in the intake duct body to direct a flow of intake air entering from the inlet toward the left and right outlets. The air flow directing structure includes a first sound reflecting part serving to block sound from a left intake pipe and a second sound reflecting part serving to block sound from a right intake pipe.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
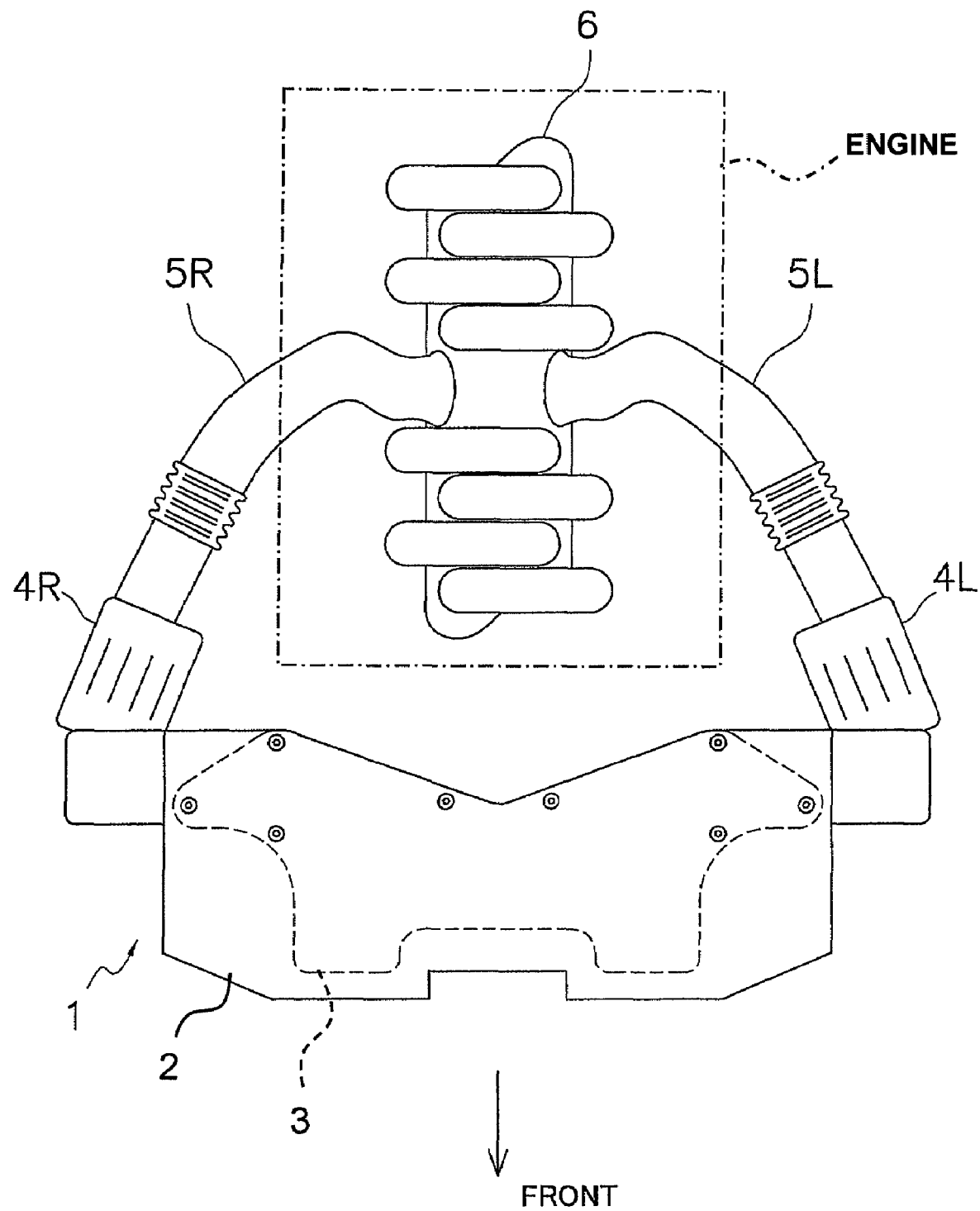
FIG. 1 is a top plan view of an air induction system including an internal combustion engine intake duct device in accordance with a first embodiment of the present invention.

Referring initially to FIG. 1, an air intake system of the internal combustion engine is illustrated that is equipped with an internal combustion engine intake duct device 1 in accordance with a first embodiment of the present invention. In this first embodiment and in the other embodiments discussed below, the internal combustion engine can be either a gasoline engine or a diesel engine.

The overall structure of the air intake system of the internal combustion engine in which the intake duct devices 1 in accordance with the embodiments are assumed to be installed will now be explained with reference to FIG. 1. FIG. 1 is a top plan view of the engine air induction system having the internal combustion engine intake duct device 1 in accordance with an embodiment of the present invention.

As shown in FIG. 1, the air induction system includes the intake duct device 1 which basically has an upper body portion 2 and a lower body portion 3. The upper and lower body portions 2 and 3 are fixedly coupled together to define an air intake passage. The air induction system further includes a left air cleaner 4L, a right air cleaner 4R, a left intake pipe 5L, a right intake pipe 5R, and an intake manifold 6. Thus, air induction system comprises two separate (left and right) air intake passages. A throttle body is installed downstream of the air cleaners but is omitted from the drawing.

The intake duct device 1 is arranged above the general vicinity of the radiator (not shown) inside the engine compartment of the vehicle. Outside air (intake air) required for the combustion conducted by the engine enters from the front of the intake duct device 1 and exits from the rear into the left air cleaner 4L and the right air cleaner 4R, which connect to the rear of the intake duct device 1.

The intake air flowing out of the intake duct device 1 is filtered by the left and right air cleaners 4L and 4R and then passes through the left and right intake pipes 5L and 5R into a surge tank (not shown) of the intake manifold 6. At the intake manifold 6, the intake air is distributed to branch pipes each corresponding to a specific cylinder and, thereby, supplied to the intake ports of the cylinders.

Figure 2A:
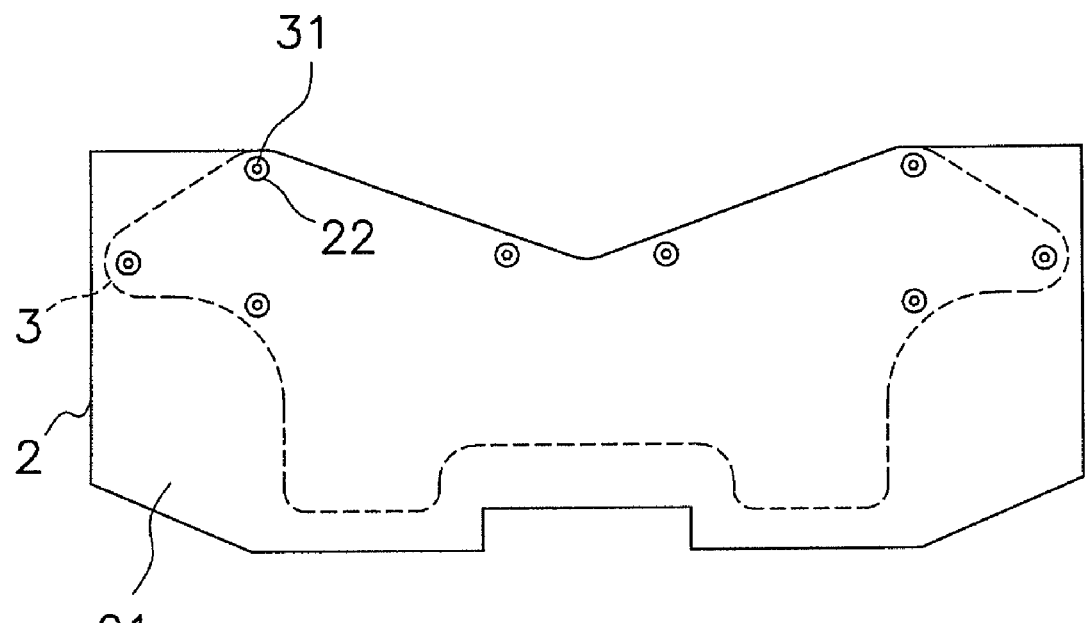
FIG. 2(a) is a top plan view of the internal combustion engine intake duct device in accordance with the first embodiment.

In accordance with the first embodiment, the main features of the intake duct device 1 will now be explained with reference to FIGS. 2(*a*), 2(*b*) and 3. FIG. 2(*a*) is a top plan view of the intake duct device 1, while FIG. 2(*b*) is a front elevational view of the intake duct device 1. FIG. 3 is a top plan view showing only the lower body portion 3 of the intake duct device 1.

As shown in FIGS. 2(*a*) and (*b*), the intake duct device 1 comprises the upper body portion 2 and the lower body portion 3, which are connected together to form a box-like structure having the intake air passage formed there-within. The upper body portion 2 basically includes a flat plate 21 with eight annular protrusions 22 provided on the upper surface of the flat plate 21. The lower body portion 3 includes a total of eight protrusions 31. The protrusions 31 of the lower body portion 31 are fitted into holes of the annular protrusions 22 and welded in place so as to fasten the upper body portion 2 and the lower body portion 3 together. The number of the annular protrusions 22 and the protrusions 31 is not limited to eight, which is merely an example. Although any desired number can be used, the number does not need to be very large because an intake air flow directing structure extending between the upper body portion 2 and the lower body portion 3, as explained below. More specifically, the intake air flow directing structure (described later) contributes to the strength of the intake duct device 1 in the vertical direction. Thus, in the example shown in FIG. 2(*a*), the overall number of the annular protrusions 22 and the protrusions 31 is small because, from a strength perspective, it is not necessary to provide the annular protrusions 22 and the protrusions 31 in the positions where the intake air flow directing structure is provided (see FIG. 3).

In order to prevent intake air from escaping from the joined surfaces of the upper body portion 2 and the lower body portion 3, the flat plate 21 of the upper body portion 2 is made large enough to completely cover the lower body portion 3. Depending on the shape of the lower body portion 3, it is also acceptable to replace the flat plate 21 with a member having a shape (e.g., not a flat plate-like shape) that conforms to shape of the joint surface of the lower formed member 3.

The main features of the lower body portion 3 will now be explained further with reference to FIG. 2(*b*) and FIG. 3. The protrusions 31 are omitted in FIG. 3 for purposes of illustration. As shown in FIG. 3, the left and right sides of the lower body portion 3 are substantially symmetrical to each other. More specifically, the lower body portion 3 has a bottom section 32, a left outlet section 33L, a right outlet section 33R, a left rear wall 34L, a right rear wall 34R, a left side wall 35L, a right side wall 35R, a first left flow directing plate 36L, a first right flow directing plate 36R, a second left flow directing plate 37L and a second right flow directing plate 37R. The flow directing plates 36L, 36R, 37L and 37R function together as the intake air flow directing structure of this embodiment. The ends of the first left and right flow directing plates 36L and 36R that are nearer the inlet opening 32*b* are connected together so as to be closed (no gap in-between), and the opposite ends of the left and right flow directing plates 36L and 36R are open with respect to the left outlet section 33L and the right outlet section 33R, respectively. The intake duct device 1 is configured to satisfy both a need to reduce the air flow resistance and a need to improve the characteristics of the intake duct device regarding sound transmitted from the internal combustion engine as discussed below.

As shown in FIG. 2(*b*) and FIG. 3, the rear walls 34L and 34R, the side walls 35L and 35R, the first flow directing plates 36L and 36R, and the second flow directing plates 37L and 37R are arranged to protrude perpendicularly upward from the bottom section 32 and to abut against the bottom surface of the flat plate 21 of the upper body portion 2 when the protrusions 31 and the annular protrusions 22 are joined together.

Together, the upper body portion 2 and the bottom section 32 of the lower body portion 3 form the intake passage inside the intake duct device 1. The bottom section 32 has a frontward face 32*a* with an inlet opening 32*b* disposed above the frontward face 32*a* for receiving fresh outside air into the intake air passage as shown in FIG. 2(*b*). As shown in FIG. 2(*b*), the frontward face 32*a* is slanted downward such that the outside air can be introduced into the intake duct device 1 with a low flow resistance.

The outlet sections 33L and 33R are provided rearward of the inlet opening 32*b* formed at the frontward face 32*a* of the bottom section 32 and are disposed laterally farther outward than the inlet opening 32*b*. Each of the outlet sections 33L and 33R has a pyramid-like structure that opens downwardly to discharge intake air into the left or right air cleaner 4L or 4R arranged downstream. More specifically, the left outlet section 33L is provided rearward of the frontward face 32*a* of the bottom section 32 and laterally leftward of the frontward face 32*a*. The left outlet section 33L has a left outlet opening 331L that opens downward. Similarly, the right outlet section 33R is provided rearward of the frontward face 32*a* of the bottom section 32 and laterally rightward of the frontward face 32*a*. The right outlet section 33R has a right outlet opening 331R that opens downward.

In this embodiment, the distance between inside edges of the left and right outlet openings 331L and 331R is substantially equal to the width of the inlet opening 32*b*. The distance between the outside edges of the left and right outlet openings 331L and 331R is larger than the width of the inlet opening 32b. Alternatively, the distance between the inside edges of the left and right outlet openings 331L and 331R is larger than the width of the inlet opening 32b. Thus, the distance between inside edges of the left and right outlet openings 331L and 331R is preferably equal to greater than the width of the inlet opening 32b.

Figure 2B:
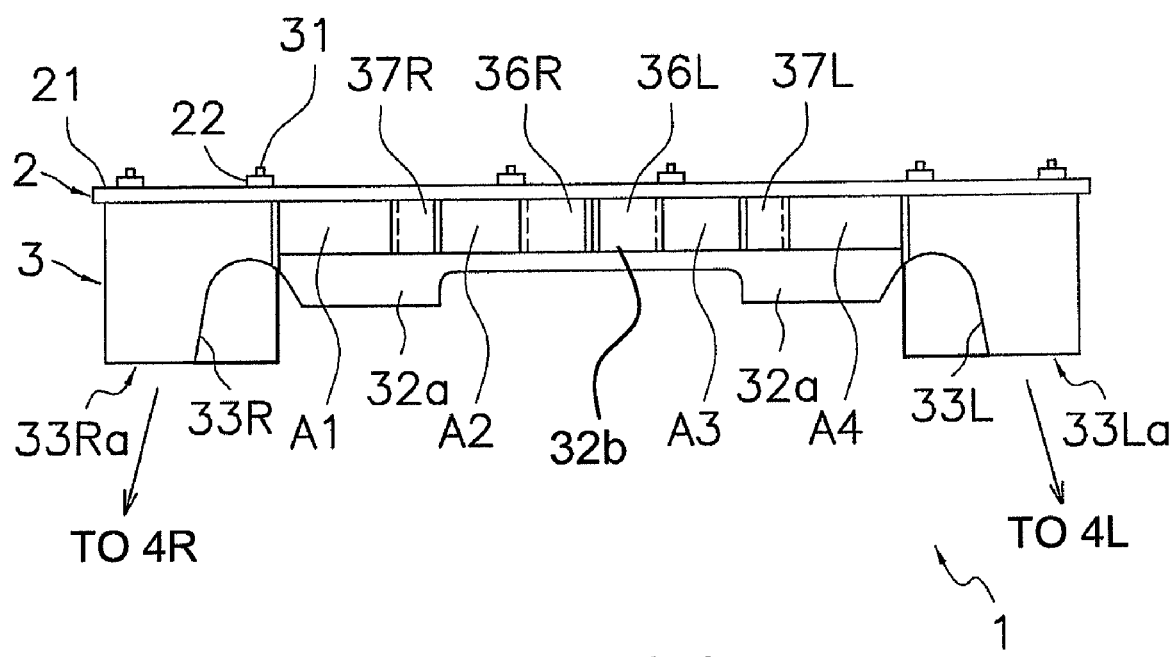
FIG. 2(b) is a front elevational view of the internal combustion engine intake duct device in accordance with the first embodiment.
Figure 3:
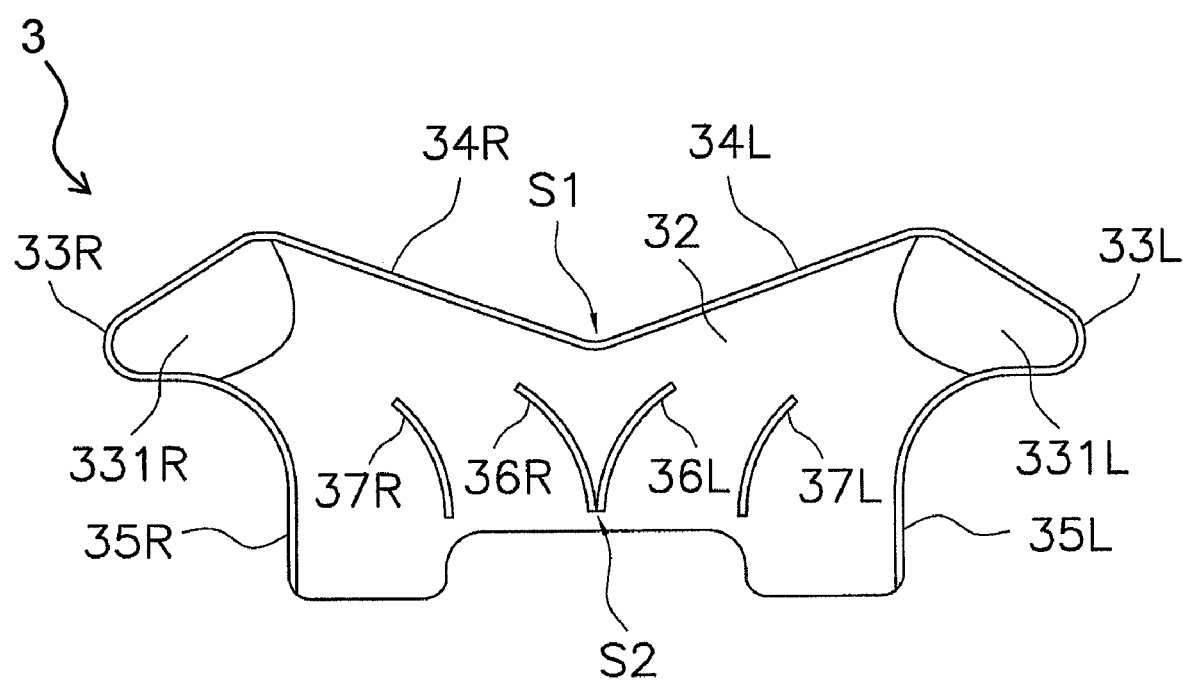
FIG. 3 is a top plan view of the lower portion of the intake duct body of the internal combustion engine intake duct device in accordance with the first embodiment.

As seen in FIGS. 2(b) and 3, the left outlet section 33L has a curved portion that extends upward from the bottommost end face 33La thereof and connects to the left rearward wall 34L and the left side wall 35L. Thus, the surface area of the left outlet section 33L in a top plan view increases as one moves upward from the bottommost end face 33La. Similarly, the right outlet section 33R has a curved portion that extends upward from the bottommost end face 33Ra thereof and connects to the right rearward wall 34R and the right side wall 35R. Thus, the surface area of the right outlet section 33R in a top plan view increases as one moves upward from the bottommost end face 33Ra.

The left side wall 35L forms a part of the intake passage running from the inlet opening 32b toward the left outlet section 33L, and is configured to curve toward the left outlet section 33L from the left end of the frontward face 32a of the bottom section 32. Similarly, the right side wall 35R forms a part of the intake passage running from the inlet opening 32b toward the right outlet section 33R and is configured to curve toward the right outlet section 33R from the right end of the frontward face 32a of the bottom section 32.

The left rearward wall 34L forms a part of the intake passage running from the inlet opening 32b toward the left outlet section 33L and is configured to extend diagonally rearward toward the left outlet section 33L from a substantially middle position (starting point S1) of the rearward side of the intake duct device 1. The right rearward wall 34R forms a part of the intake passage running from the inlet opening 32b toward the right outlet section 33R and is configured to extend diagonally rearward toward the right outlet section 33R from the same starting point S1.

The first flow directing plates 36L and 36R and the second flow directing plates 37L and 37R serve to regulate the flow directions of the intake air flows flowing from the inlet opening 32b of the intake duct device 1 toward the outlet openings 331L and 331R and to supply the intake air to the air cleaners 4L and 4R with a low air flow resistance. Therefore, the first flow directing plates 36L and 36R and the second flow directing plates 37L and 37R are configured to curve gradually toward the openings of the two outlet sections 33L and 33R from the front face 32a of the bottom section 32 when observed in a top plan view, as shown in FIG. 3.

The inwardly curved surface of the first left flow directing plate 36L of the air flow directing structure forms a part of the intake air passage leading toward the left outlet opening 331L and the outwardly curved surface of the same faces toward the right outlet opening 331R. Meanwhile, the inwardly curved surface of the first right flow directing plate 36R of the air flow directing structure forms a part of the intake air passage leading toward the right outlet opening 331R and the outwardly curved surface of the same faces toward the left outlet opening 331L.

The first left flow directing plate 36L curves gradually toward the opening 331L of the left outlet section 33L from a substantially middle position (start point S2) of the frontward face 32a of the bottom section 32. The first right flow directing plate 36R is curves gradually toward the opening 331R of the right outlet section 33R from the same starting point S2 as the first left flow directing plate 36L. The first flow directing plates 36L and 36R are arranged to be closed with respect to the inlet side of the air flow directing structure. In other words, the first flow directing plates 36L and 36R are closed with respect to the frontward direction at the frontward starting point S2.

The second left flow directing plate 37L curves gradually toward the opening 331L of the left outlet section 33L from a starting point (position) located leftward of the starting point S2 of the first left flow directing plate 36L. The second right flow directing plate 37R is curves gradually toward the opening 331R of the right outlet section 33R from a starting point (position) located rightward of the starting point S2 of the first right flow directing plate 36R. As shown in FIG. 3, the ending point of the first left flow directing plate 36L (i.e., the position of the outlet end opposite the inlet end positioned at the starting point S2) stops short of (i.e., does not reach) the left rearward wall 34L. The first left flow directing plate 36L has a generally shallow C-shape that is arranged to block the inlet opening at the starting point S2 and be open toward the rear at the opposite end.

While one side (surface) of the first right flow directing plate 36R faces toward (points toward) the left outlet opening 331L, the other side faces generally toward the inlet opening 32b and forms a portion of an intake air passage serving to supply intake air to the right outlet opening 331R. As a result, the side facing the left outlet opening 331L functions as a blocked end (sound reflecting surface) serving to reflect sound coming from the left outlet opening 331L.

The ending point of the first right flow directing plate 36R stops short of (i.e., does not reach) the right rearward wall 34R. While one side (surface) of the first left flow directing plate 36L faces toward (points toward) the right outlet opening 331R, the other side faces generally toward the inlet opening 32b and forms a portion of an intake air passage serving to supply intake air to the left outlet opening 331L. As a result, the side facing the right outlet opening 331R functions as a blocked end (sound reflecting surface) serving to reflect sound coming from the right outlet opening 331R.

In the intake duct device 1 in accordance with this embodiment, the second flow directing plates 37L and 37R are auxiliary to the first flow directing plates 36L and 36R. In other words, the flow of the intake air could be directed and the air flow resistance could be reduced even if the intake duct device 1 was provided with only the first flow directing plates, but the air flow resistance is reduced even further by providing the second flow directing plates 37L and 37R.

With the upper body portion 2 and the lower body portion 3 configured as described above, the intake duct device 1 has four openings through which outside air can enter. More specifically, as shown in FIG. 2(b), the intake duct device 1 has an opening A1 located between the right side wall 35R and the second right flow directing plate 37R, an opening A2 located between the second right flow directing plate 37R and the first right flow directing plate 36R, an opening A3 located between the first left flow directing plate 36L and the second left flow directing plate 37L, and an opening A4 located between the second left flow directing plate 37L and the left side wall 35L.

Figure 4:
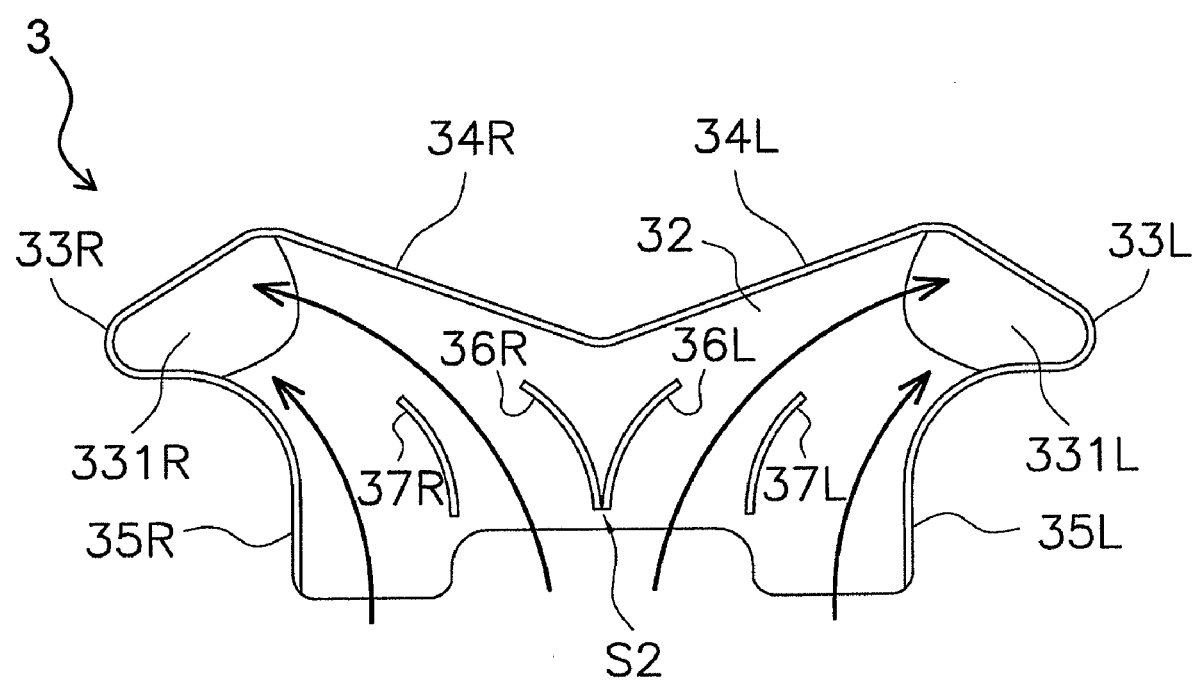
FIG. 4 is a top plan view, similar to FIG. 3, of the lower portion of the intake duct body of the internal combustion engine intake duct device but with the flow directions of the intake air indicated.
Figure 5:
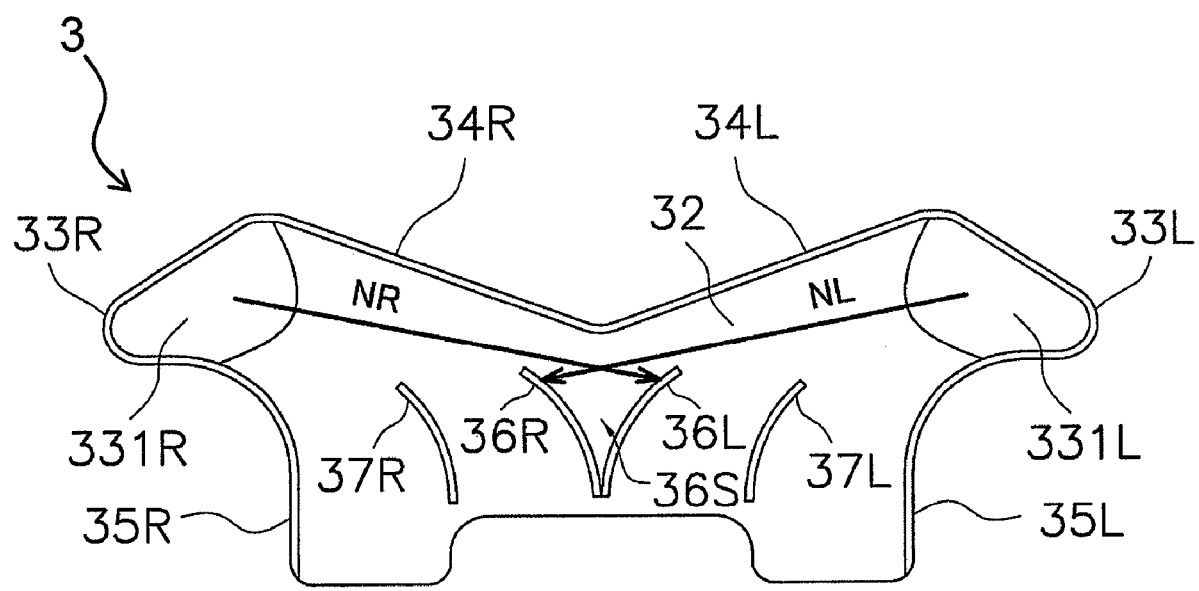
FIG. 5 a top plan view, similar to FIG. 3, of the lower portion of the intake duct body of the internal combustion engine intake duct device the travel directions of the sound from the engine indicated.

The operation of the intake duct device 1 in accordance with this embodiment will now be explained chiefly with reference to FIGS. 4 and 5. FIG. 4 is a front elevational view of the lower body portion 3 that is basically the same as FIG. 3, except that it indicates the flow directions of the intake air with arrows. FIG. 5 is a front elevational view of the lower body portion 3 that is basically the same as FIG. 3, except that it indicates the directions in which sound is transmitted from the engine with arrows.

First, the flow of intake air in the intake duct device 1 will be explained with reference to FIG. 4. When the vehicle in which the engine is installed moves, outside air (intake air) enters through the inlet opening 32b located on the frontward face of the intake duct device 1 in a top plan view, as shown in FIG. 4. Since the first flow directing plates 36L and 36R are closed with respect to the frontward direction at the starting point S2, the entering intake air is distributed in two directions to the left and right.

The intake air flowing to the left from the starting point S2 flows to the left outlet opening 331L and into the left air cleaner 4L with a low flow resistance because the first left flow directing plate 36L, the second left flow directing plate 37L, and the left side wall 35L all curve toward the left outlet opening 331L of the left outlet section 33L. The intake air flowing to the right from the starting point S2 flows to the right outlet opening 331R and into the right air cleaner 4R with a low flow resistance because the first right flow directing plate 36R, the second right flow directing plate 37R, and the right side wall 35R all curve toward the right outlet opening 331R of the right outlet section 33R.

The transmission of sound from the engine in the intake duct device 1 will now be explained with reference to FIGS. 1 and 5. Sound occurring due to the operation of the engine travels in the opposite direction as the intake air flows in the air induction system shown in FIG. 1. Thus, the sound resulting from the operation of the cylinders travels through the intake manifold 6 to the left intake pipe 5L and the right intake pipe 5R. The sound then travels through the left and right air cleaners 4L and 4R to the intake duct device 1.

In the intake duct device 1, the rearward end of the first right flow directing plate 36R does not contact the right rearward wall 34R and the rearward side of the first right flow directing plate 36R faces toward the left outlet opening 331L. Consequently, sound entering from the left air cleaner 4L (indicated as NL in FIG. 5) is not blocked by the first left flow directing plate 36L and reaches the first right flow directing plate 36R because the first left flow directing plate 36L does not extend all the way to the left rearward wall 34L. Similarly, the rearward end of the first left flow directing plate 36L does not contact the left rearward wall 34L and the rearward side of the first left flow directing plate 36L faces toward the right outlet opening 331R. Consequently, sound entering from the right air cleaner 4R (indicated as NR in FIG. 5) is not blocked by the first right flow directing plate 36R and reaches the first left flow directing plate 36L because the first right flow directing plate 36R does not extend all the way to the right rearward wall 34R.

Additionally, since the first flow directing plates 36L and 36R are arranged to be closed with respect to the forward direction at the starting point S2, the sound NL from the left and the sound NR from the right cancel each other out in the space 36S (see FIG. 5) formed by the first flow directing plates 36L and 36R.

In comparison with an intake duct device that is not provided with a pair of first flow directing plates (36L and 36R), the intake duct device 1 of this embodiment shifts the engine speed at which canceling out of the sounds NL and NR from the left and right occurs to a higher engine speed. More specifically, the distance over which the sound waves travel through the passages of the air induction system (sound transmission passages) before they reach a blocked end (sound reflecting surface) that causes the sound to bounce back is shorter when a pair of first flow directing plates 36L and 36R is provided. This is because when the first flow directing plates 36L and 36R are not provided, the sound must travel, for example, to the side walls of the intake duct device before it bounces back. Thus, since the distance is shorter when the first flow directing plates 36L and 36R are provided, the engine speed at which canceling out occurs is higher.

Figure 6:
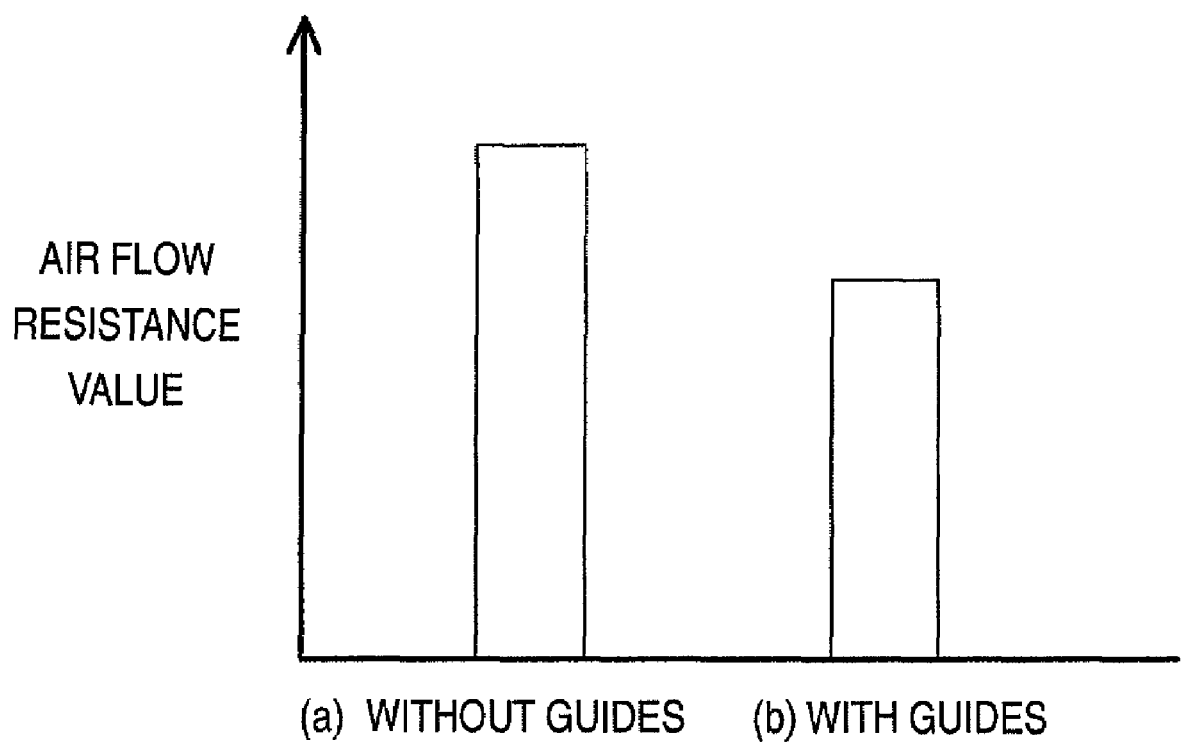
FIG. 6 is a graph that illustrates how the air flow resistance value differs depending on whether or not flow directing plates are provided.

FIG. 6 illustrates how the air flow resistance value differs depending on whether or not flow directing plates (a pair of first flow directing plates and a pair of second flow directing plates) are provided. The air flow resistance value shown in FIG. 6 is obtained from a simulation of the pressure loss occurring across the intake duct device 1 when a prescribed flow rate of air is passed through the intake duct device 1. As shown in FIG. 6, the air flow resistance value is lower when flow directing plates (first flow directing plates and second flow directing plates) are provided.

Figure 7:
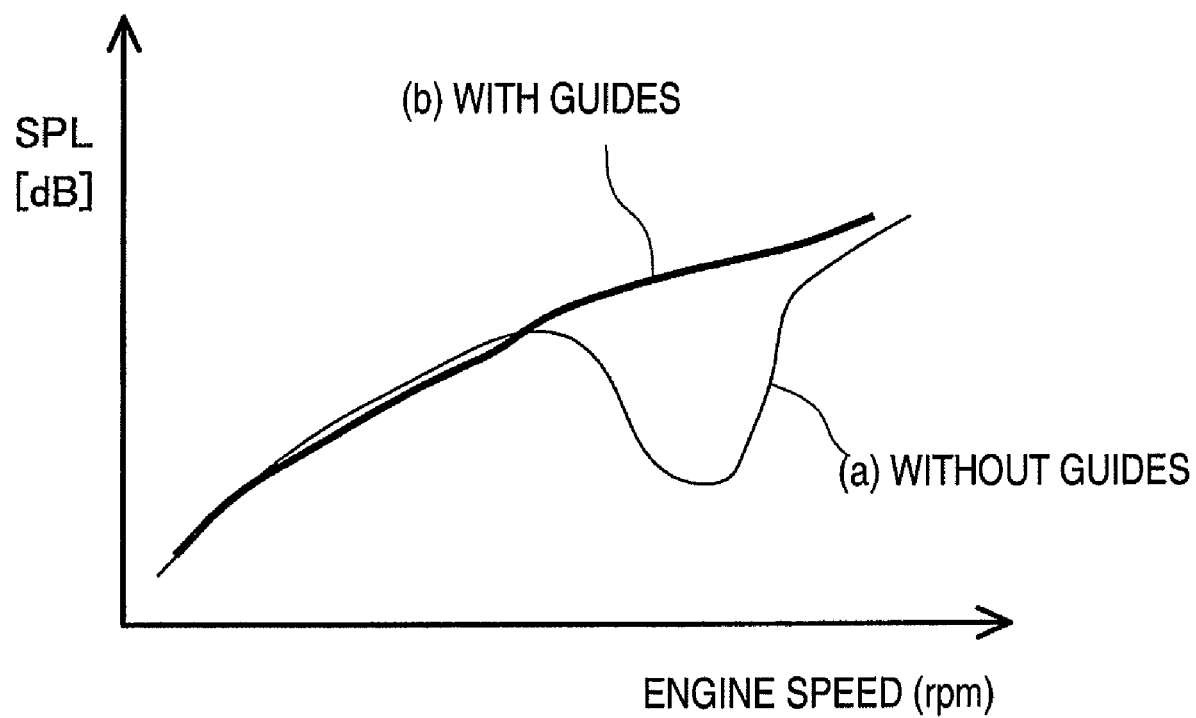
FIG. 7 is a graph that illustrates how the sound pressure level differs depending on whether or not flow directing plates are provided.

FIG. 7 illustrates how the sound pressure level SPL differs depending on whether or not flow directing plates (a pair of first flow directing plates and a pair of second flow directing plates) are provided. The sound pressure level SPL is obtained with a simulation of the overall sound pressure as a function of the engine speed.

The engine speed at which the sounds transmitted from the left and right outlets cancel each other out is higher with the intake duct device 1 than with an intake duct device that is not provided with a pair of first flow directing plates (36L and 36R). Consequently, as shown in FIG. 7, an engine equipped with an intake duct device 1 can avoid a decline in sound pressure level SPL in the region of normally used engine speeds. Thus, in the region of normally used engine speeds, the sound pressure level SPL increases linearly as the engine speed increases and the tone of the engine in the normally used engine speed region can be improved in comparison with a conventional engine without such flow directing plates.

Also the engine speed at which the sounds transmitted from the left and right outlet sections 33L and 33R cancel each other out can be adjusted by changing the configuration of the air flow directing structure, e.g., by providing a pair of second flow directing plates in addition to the first flow directing plates.

As explained previously, the intake duct device 1 is provided with the first left and right flow directing plates 36L and 36R (a pair of flow directing plates) that curve from the inlet opening 32b toward the left and right outlet sections 33L and 33R (a pair of outlet openings), respectively. The ends of the first left and right flow directing plates 36L and 36R that are nearer the inlet opening 32b are connected together so as to be closed (no gap in-between), and the opposite ends of the left and right flow directing plates 36L and 36R are open with respect to the left and right outlet sections 33L and 33R, respectively.

Consequently, with this intake duct device 1, the intake air can be passed to the downstream passages of the air induction system with a lower flow resistance, and the engine speed at which the sounds that travel from the engine to the intake duct device via the left and right intake pipes cancel each other out can be increased such that the level of the sound increases linearly with respect to increasing engine speed in a region of normally used engine speeds. As a result, the overall operating tone of the engine can be improved in the region of normally used engine speeds.

In this intake duct device 1, it is preferable to provide a pair of second flow directing plates arranged on the outside of the first flow directing plates. It is also acceptable to provide more than one pair of second flow directing plates. The second flow directing plates does not contribute to the tone improvement, but it does increase the flow directing effect in comparison with using only the first flow directing plates and, thus, improves (reduces) the air flow resistance.

Second Embodiment

Figure 8:
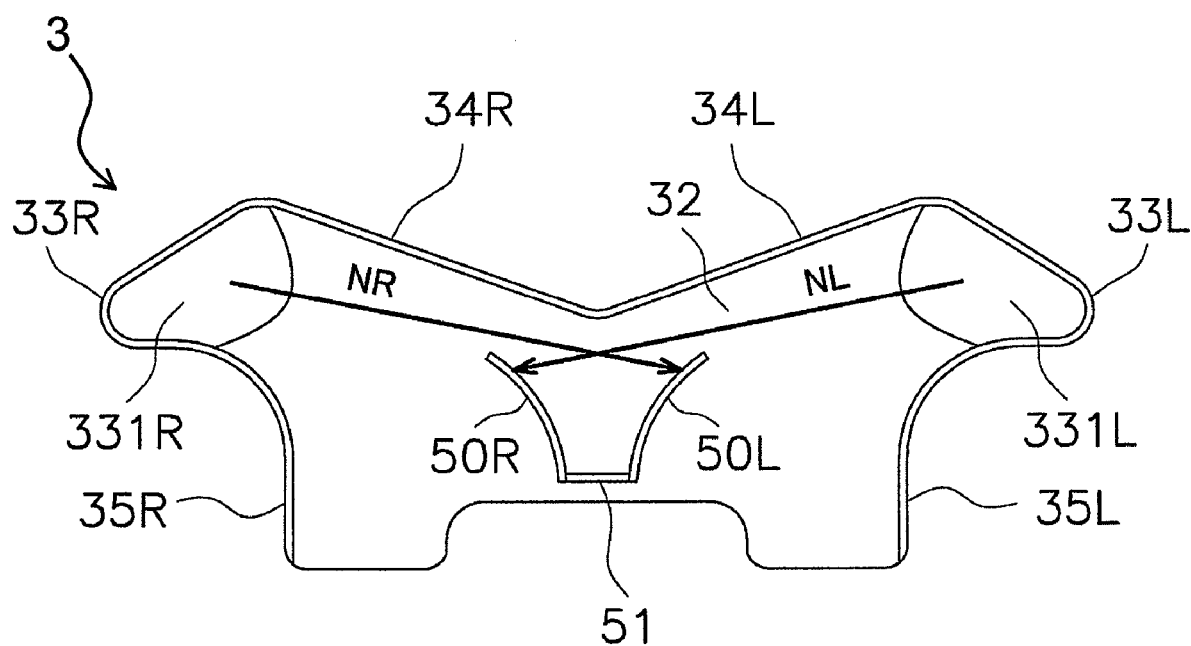
FIG. 8 is a top plan view of the lower portion of the intake duct body of the internal combustion engine intake duct device in accordance with a second embodiment of the present invention.

Referring now to FIG. 8, an intake duct device is illustrated in accordance with a second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Basically, the lower body portion 3 is illustrated with a modified air flow directing structure. Thus, the modified air flow directing structure is used in conjunction with the other components of the air induction system illustrated in FIG. 1.

FIG. 8 is a front elevational view of the lower body portion 3 having the modified air flow directing structure. The lower body portion 3 shown in FIG. 8 has a plate 51 with a prescribed width provided in a substantially middle position of the front face 32a of the bottom section 32. A first left flow directing plate 50L curves gradually toward the opening 331L of the left outlet section 33L from the left end of the plate 51. Similarly, the first right flow directing plate 50R curves gradually toward the opening 331R of the right outlet section 33R from the right end of the plate 51. Therefore, the air flow directing structure is closed with respect to the frontward direction due to the arrangement of the first flow directing plates and the plate 51. The intake duct device shown in FIG. 8 is not provided with a pair of second flow directing plates.

The intake duct device shown in FIG. 8 achieves a flow directing effect due to the first flow directing plates 50L and 50R of the lower body portion 3. Meanwhile, the distance to the blocked end (the sound reflecting surface of first left flow directing plate 50L or first right flow directing plate 50R) in the sound transmission passage passages of air induction system) is different from when the intake duct device 1 is used (see FIGS. 5 and 8). This distance can be adjusted by adjusting the width of the plate 51 provided in the lower body portion 3 of this embodiment.

As a result, the engine speed at which the sounds transmitted from the left and right outlet sections 33L and 33R cancel each other out can be adjusted. More specifically, the smaller the width of the plate 51 is, the higher the engine speed at which canceling out of the sound occurs.

Third Embodiment

Figure 9:
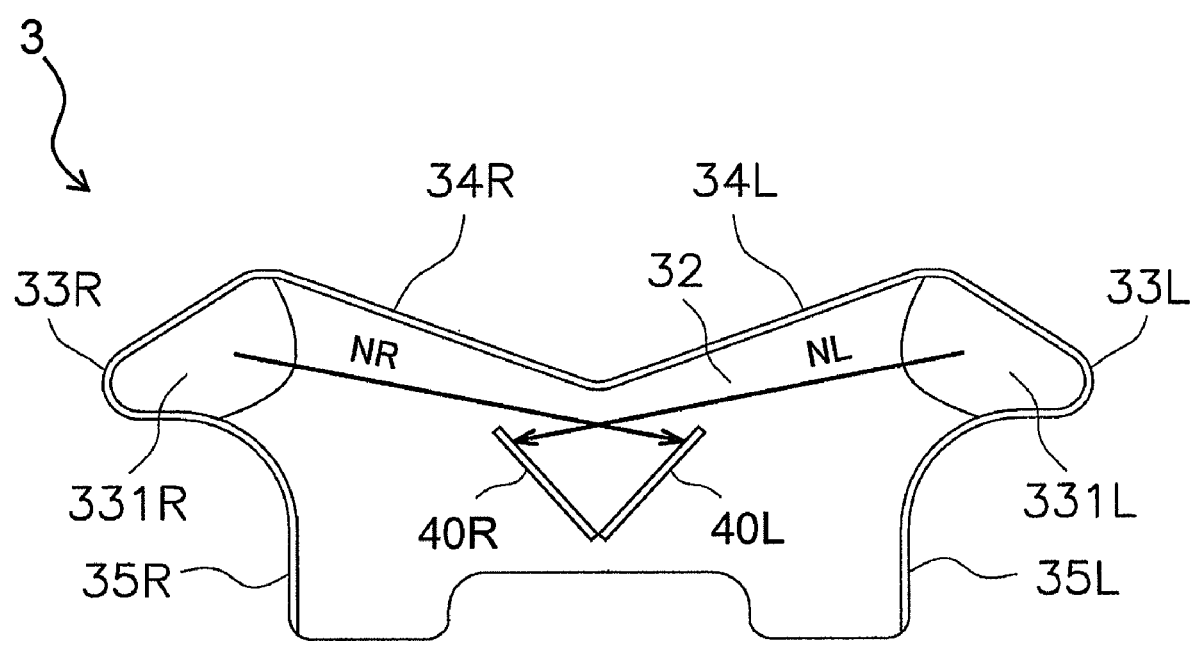
FIG. 9 is a top plan view of the lower portion of the intake duct body of the internal combustion engine intake duct device in accordance with a third embodiment of the present invention.

Referring now to FIG. 9, an intake duct device is illustrated in accordance with a third embodiment. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. Basically, the lower body portion 3 is illustrated with a modified air flow directing structure. Thus, the modified air flow directing structure is used in conjunction with the other components of the air induction system illustrated in FIG. 1.

FIG. 9 is a front elevational view of the lower body portion 3 in accordance with the third embodiment having the modified air flow directing structure. In the lower body portion 3 shown in FIG. 9, the first left flow directing plate 40L and the first right flow directing plate 40R are substantially straight flat plates instead of curved like the first left and right flow directing plates 36L and 36R of the first embodiment. Similarly to the first embodiment, in this embodiment the sides of the first left and right flow directing plates 40L and 40R that face toward the outlet openings 331R and 331L serve as blocked ends (sound reflecting surfaces) with respect to sound from the intake pipes 5R and 5L and the sides that face the inlet opening 32b serve to form portions of intake air flow passages.

Fourth and Fifth Embodiment

Figure 10:
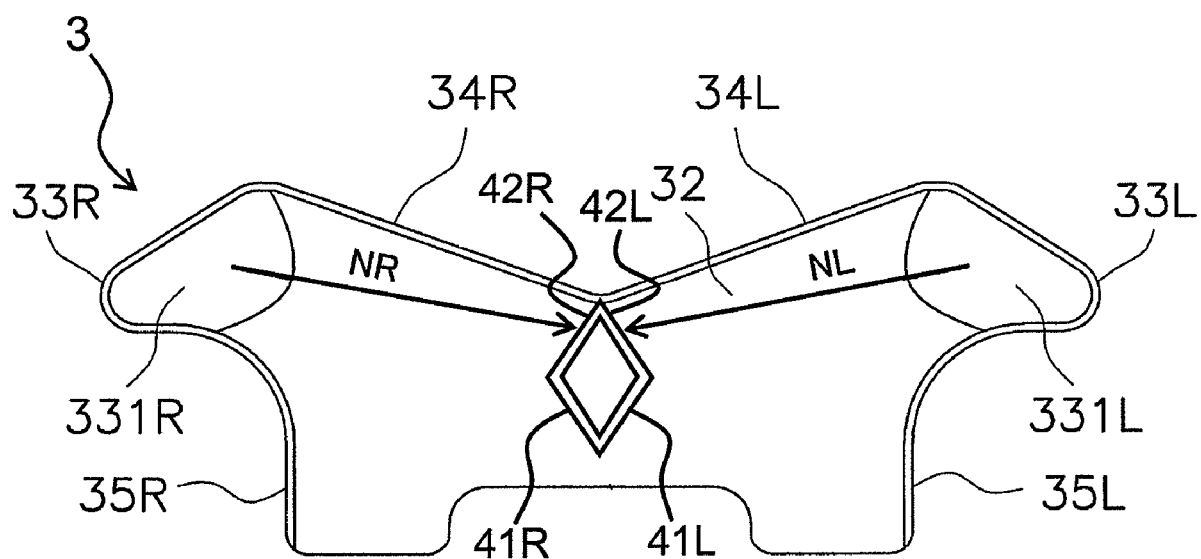
FIG. 10 is a top plan view of the lower portion of the intake duct body of the internal combustion engine intake duct device in accordance with a fourth embodiment of the present invention.
Figure 11:
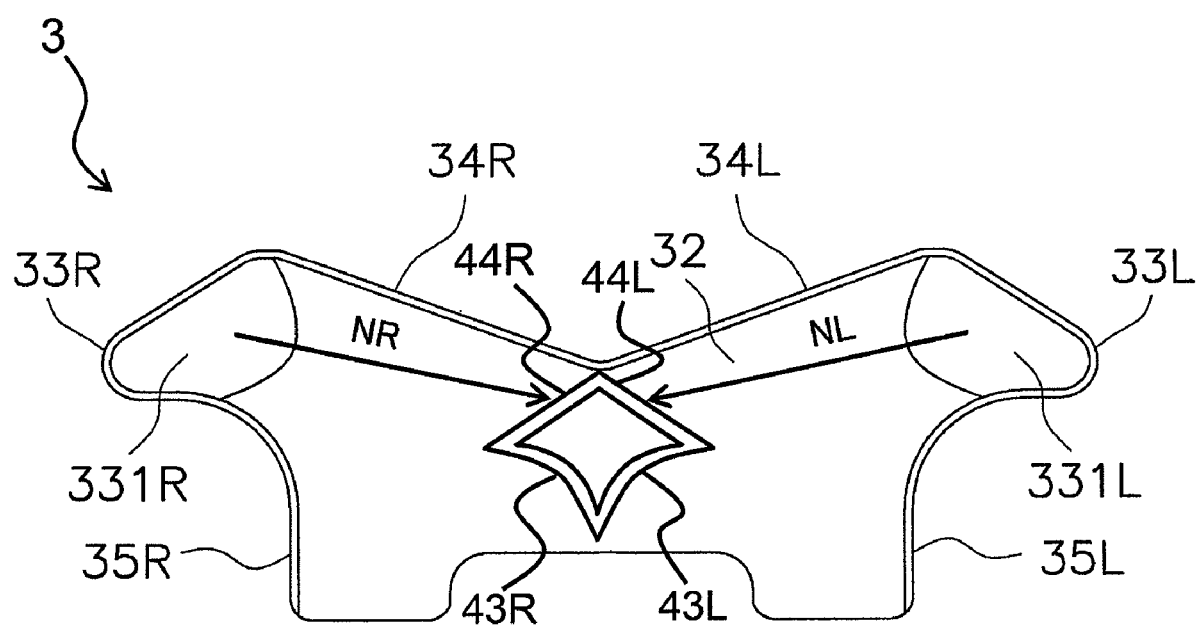
FIG. 11 is a top plan view of the lower portion of the intake duct body of the internal combustion engine intake duct device in accordance with a fifth embodiment of the present invention.

Referring now to FIGS. 10 and 11, intake duct devices are illustrated in accordance with fourth and fifth embodiments. In view of the similarity between these embodiments and first embodiment, the parts of the fourth and fifth embodiments that are identical to the parts of the first embodiment will be given the same reference numerals as the parts of the first embodiment. Moreover, the descriptions of the parts of the fourth and fifth embodiments that are identical to the parts of the first embodiment may be omitted for the sake of brevity. Basically, the lower body portion 3 is illustrated with a modified air flow directing structure. Thus, the modified air flow directing structure is used in conjunction with the other components of the air induction system illustrated in FIG. 1.

FIGS. 10 and 11 are front elevational views of the lower body portion 3 in accordance with the fourth embodiment and the fifth embodiment, respectively, having the modified air flow directing structure. The lower body portion 3 shown in FIG. 10 has an air flow directing structure shaped generally like a four-sided column or pillar instead of the curved first left and right flow directing plates 36L and 36R of the first embodiment. Thus, in this embodiment, the side wall surfaces (sides) of the four-sided column include a left rearward wall surface 44L and a right rearward wall surface 44R that face toward the left and right outlet openings 331L and 331R and can serve as blocked ends (sound reflecting surfaces) with respect to sound from the intake pipes 5L and 5R in the same manner as the rearward sides of the first flow directing plates 36L and 36R of the first embodiment. Meanwhile, the side of the four-sided column facing the inlet opening 32b has a left frontward wall surface 41L and a right frontward wall surface 41R, each of which forms a portion of an intake air flow passage.

The air flow directing structure of the lower body portion 3 shown in FIG. 11 is similar to the four-sided column structure of the air flow directing structure of the fourth embodiment, except for the side facing the inlet opening 32b is changed, i.e., the straight left and right frontward wall surfaces 41L and 41R are replaced with curved left and right frontward wall surfaces 43L and 43R. As a result, in addition to the effects of the fourth embodiment, the fifth embodiment can reduce the air flow resistance of the intake air passages.

In the above mentioned embodiments of the intake duct device, it is preferable for the ends of the two first flow directing plates 36L and 36R that are nearer the inlet opening 32b to be positioned at the same position (starting point S2 in FIG. 3) located substantially in the middle as measures in the transverse direction relative to the inlet opening 32b. As a result, the distance from the left outlet section 33L to the first right flow directing plate 36R and the distance from the right outlet section 33R to the first left flow directing plate 36L are minimized. Thus, the engine speed at which the sounds that travel from the engine to the intake duct device via the left and right intake pipes cancel each other out can be increased such that rotational speed region in which the tone of the engine is good is expanded.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Additionally, as used herein to describe the above embodiments, it is assumed that the movement direction of the vehicle is a forward (frontward) direction and such other direction terms as left, right, frontward, rearward, lateral (transverse), and longitudinal are defined based on this assumption. Thus, the following directional terms "forward, rearward, above, downward, vertical, horizontal, below and transverse" as well as any other similar directional terms refer to those directions of a vehicle equipped with the present invention. In other words, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine intake duct device comprising:
    an intake duct body having an inlet, a left outlet and a right outlet with an intake air passage formed in the intake duct body for supplying intake air from the inlet to left and right outlets, the inlet being disposed on an opposite side of the intake duct body from the left and right outlets and laterally between the left and right outlets in a top plan view; and
    an air flow directing structure arranged in the intake duct body to direct a flow of intake air entering from the inlet toward the left and right outlets, the air flow directing structure including a first sound reflecting part serving to block sound from a left intake pipe and a second sound reflecting part serving to block sound from a right intake pipe,
    the left and right intake pipes being arranged downstream of the left and right outlet, respectively, and being arranged upstream of an intake manifold to supply the intake air to the intake manifold with the intake manifold being arranged to distribute the intake air to a plurality of cylinders of an internal combustion engine.

2. An internal combustion engine equipped with the internal combustion engine intake duct device as recited in claim 1, further comprising
    the left intake pipe connected to the intake duct device; and
    the right intake pipe connected to the intake duct device.

3. An internal combustion engine intake duct device comprising:
    an intake duct body having an inlet, a left outlet and a right outlet with an intake air passage formed in the intake duct body for supplying intake air from the inlet to left and right outlets, the inlet being disposed on an opposite side of the intake duct body from the left and right outlets and laterally between the left and right outlets in a top plan view; and
    an air flow directing structure arranged in the intake duct body to direct a flow of intake air entering from the inlet toward the left and right outlets, the air flow directing structure including a first sound reflecting part serving to block sound from a left intake pipe and a second sound reflecting part serving to block sound from a right intake pipe,
    the air flow directing structure including a first right flow directing plate arranged to direct intake air entering from the inlet toward the right outlet; and
    the air flow directing structure including a first left flow directing plate arranged to direct intake air entering from the inlet toward the left outlet.

4. The internal combustion engine intake duct device as recited in claim 3, wherein
    the first right flow directing plate of the air flow directing structure is arranged and configured such that one side faces toward the left outlet as the first sound reflecting part and another side forms an intake air passage leading to the right outlet; and
    the first left flow directing plate of the air flow directing structure is arranged and configured such that one side faces toward the right outlet as the second sound reflecting part and another side forms an intake air passage leading to the left outlet.

5. The internal combustion engine intake duct device as recited in claim 3, wherein
    each of the first right and left flow directing plates has an inlet end that is disposed closer to the inlet, with the inlet ends of the first right and left flow directing plates being connected together.

6. The internal combustion engine intake duct device as recited in claim 3, wherein
    each of the first right and left flow directing plates has an inlet end that is disposed at a middle area of the inlet as measured in a lateral direction with respect to the left and right outlets.

7. The internal combustion engine intake duct device as recited in claim 3, wherein
each of the first right and left flow directing plates has an inlet end and an outlet end, with the inlet ends of the first right and left flow directing plates being connected to be close a central area between the first right and left flow directing plates and the outlet ends of the first right and left flow directing plates being separates to form a space therebetween.

8. The internal combustion engine intake duct device as recited in claim 3, wherein
the air flow directing structure further includes a second right flow directing plate arranged closer to the right outlet than the first right flow directing plate, with the second right flow directing plate curved from the inlet towards the right outlet; and
the air flow directing structure further includes a second left flow directing plate arranged closer to the left outlet than the first left flow directing plate, with the second left flow directing plate curved from the inlet towards the left outlet.

9. An internal combustion engine intake duct device comprising:
an intake duct body having an inlet, a left outlet and a right outlet with an intake air passage formed in the intake duct body for supplying intake air from the inlet to left and right outlets, the inlet being disposed on an opposite side of the intake duct body from the left and right outlets and laterally between the left and right outlets in a top plan view; and
an air flow directing structure arranged in the intake duct body to direct a flow of intake air entering from the inlet toward the left and right outlets, the air flow directing structure including a first sound reflecting part serving to block sound from a left intake pipe and a second sound reflecting part serving to block sound from a right intake pipe,
the air flow directing structure including a first right flow directing plate that is curved to direct intake air entering from the inlet toward the right outlet; and
the air flow directing structure including a first left flow directing plate that is curved to direct intake air entering from the inlet toward the left outlet.

10. The internal combustion engine intake duct device as recited in claim 9, wherein
the first right flow directing plate of the air flow directing structure includes an inwardly curved surface forming a right intake air passage leading to the right outlet and an outwardly curved surface facing toward the left outlet as the first sound reflecting part; and
the first left flow directing plate of the air flow directing structure includes an inwardly curved surface forming a left intake air passage leading to leading to the left outlet and the outwardly curved surface facing toward the right outlet as the second sound reflecting part.

11. An internal combustion engine intake duct device comprising:
an intake duct body having an inlet, a left outlet and a right outlet with an intake air passage formed in the intake duct body for supplying intake air from the inlet to left and right outlets, the inlet being disposed on an opposite side of the intake duct body from the left and right outlets and laterally between the left and right outlets in a top plan view; and
an air flow directing structure arranged in the intake duct body to direct a flow of intake air entering from the inlet toward the left and right outlets, the air flow directing structure including a first sound reflecting part serving to block sound from a left intake pipe and a second sound reflecting part serving to block sound from a right intake pipe,
the air flow directing structure including a four-sided column having a first left side facing toward the left outlet to form the first sound reflecting part, a first right side facing toward the right outlet to form the second sound reflecting part, a second left side facing toward the inlet to form a part of the intake air passage leading from the inlet to the left outlet, and a second right side facing toward the inlet to form a part of the intake air passage leading from the inlet to the right outlet.

12. The internal combustion engine intake duct device as recited in claim 11, wherein
the second left side is curved to direct intake air entering from the inlet toward the left outlet, and a second right side is curved to direct intake air entering from the inlet toward the right outlet.

13. An internal combustion engine comprising:
an internal combustion engine intake duct device including
an intake duct body having an inlet, a left outlet and a right outlet with an intake air passage formed in the intake duct body for supplying intake air from the inlet to left and right outlets, the inlet being disposed on an opposite side of the intake duct body from the left and right outlets and laterally between the left and right outlets in a top plan view, and
an air flow directing structure arranged in the intake duct body to direct a flow of intake air entering from the inlet toward the left and right outlets;
a left intake pipe connected to the intake duct device; and
a right intake pipe connected to the intake duct device,
the air flow directing structure including a first sound reflecting part serving to block sound from the left intake pipe and a second sound reflecting part serving to block sound from the right intake pipe;
the air flow directing structure including a first right flow directing plate arranged to direct intake air entering from the inlet toward the right outlet; and
the air flow directing structure including a first left flow directing plate arranged to direct intake air entering from the inlet toward the left outlet.

14. The internal combustion engine as recited in claim 13, wherein
each of the first right and left flow directing plates has an inlet end and an outlet end, with the inlet ends of the first right and left flow directing plates being connected to be close a central area between the first right and left flow directing plates and the outlet ends of the first right and left flow directing plates being separates to form a space therebetween.

15. The internal combustion engine as recited in claim 13, wherein
the air flow directing structure further includes a second right flow directing plate arranged closer to the right outlet than the first right flow directing plate, with the second right flow directing plate curved from the inlet towards the right outlet; and
the air flow directing structure further includes a second left flow directing plate arranged closer to the left outlet than the first left flow directing plate, with the second left flow directing plate curved from the inlet towards the left outlet.

16. An internal combustion engine comprising:
an internal combustion engine intake duct device including an intake duct body having an inlet, a left outlet and a right outlet with an intake air passage formed in the intake duct body for supplying intake air from the inlet to left and right outlets, the inlet being disposed on an opposite side of the intake duct body from the left and right outlets and laterally between the left and right outlets in a top plan view, and an air flow directing structure arranged in the intake duct body to direct a flow of intake air entering from the inlet toward the left and right outlets;

a left intake pipe connected to the intake duct device; and a right intake pipe connected to the intake duct device, the air flow directing structure including a first sound reflecting part serving to block sound from the left intake pipe and a second sound reflecting part serving to block sound from the right intake pipe; and the air flow directing structure including a four-sided column having a first left side facing toward the left outlet to form the first sound reflecting part, a first right side facing toward the right outlet to form the second sound reflecting part, a second left side facing toward the inlet to form a part of the intake air passage leading from the inlet to the left outlet, and a second right side facing toward the inlet to form a part of the intake air passage leading from the inlet to the right outlet.

17. An internal combustion engine intake duct device comprising:

an intake duct body having an inlet, a left outlet and a right outlet with an intake air passage formed in the intake duct body for supplying intake air from the inlet to left and right outlets, the inlet being disposed on an opposite side of the intake duct body from the left and right outlets and laterally between the left and right outlets in a top plan view; and an air flow directing structure arranged in the intake duct body to direct a flow of intake air entering from the inlet toward the left and right outlets, the air flow directing structure including a first right flow directing plate arranged to direct intake air from the inlet toward the right outlet and a first left flow directing plate arranged to direct intake air from the inlet toward the left outlet, the first left flow directing plate of the air flow directing structure being arranged such that one side forms an intake air passage leading from the inlet toward the left outlet and another side faces toward the right outlet, and the first right flow directing plate of the air flow directing structure being arranged such that one side forms an intake air passage leading from the inlet toward the right outlet and another side faces toward the left outlet.

18. An internal combustion engine intake duct device comprising:

intake air passage means for defining left and right intake air passages to communicate intake air laterally from air inlet means to a left outlet means and a right outlet means disposed on an opposite side from the air inlet means in a top plan view; and air flow directing means for directing a flow of the intake air entering from the air inlet means toward the left and right outlet means, and for blocking sound from left and right intake pipes;

the left and right intake pipes being arranged downstream of the left and right outlet means, respectively, and being arranged upstream of an intake manifold to supply the intake air to the intake manifold with the intake manifold being arranged to distribute the intake air to a plurality of cylinders of an internal combustion engine.

19. The internal combustion engine intake duct device as recited in claim 18, wherein the air flow directing means includes first right flow directing means for directing intake air entering from the inlet means toward the right outlet means; and the air flow directing means includes a first left flow directing means for directing intake air entering from the inlet means toward the left outlet means.

20. An internal combustion engine intake duct device comprising:

intake air passage means for defining left and right intake air passages to communicate intake air laterally from air inlet means to a left outlet means and a right outlet means disposed on an opposite side from the air inlet means in a top plan view; and air flow directing means for directing a flow of the intake air entering from the air inlet means toward the left and right outlet means, and for blocking sound from the left and right outlet means, the air flow directing means including four-sided column means for forming a first sound reflecting part, a second sound reflecting part, a part of the intake air passage leading from the inlet means to the left outlet means, and a part of the intake air passage leading from the inlet means to the right outlet means.

* * * * *